United States Patent
O'Kelley, II et al.

(10) Patent No.: US 8,388,449 B2
(45) Date of Patent: *Mar. 5, 2013

(54) SYSTEM AND METHOD FOR CONFIGURING GAME DATA ABOUT PLAYERS

(75) Inventors: Patrick W. O'Kelley, II, Seattle, WA (US); Steven D. Lamb, Woodinville, WA (US); Vincent H. Curley, Bellevue, WA (US); Ling Tony Chen, Bellevue, WA (US); Michal Bortnik, Seattle, WA (US); James Hsi-Kai Jen, Seattle, WA (US); Jerry Alan Johnson, Medina, WA (US); Johan Peter Hansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/227,209

(22) Filed: Sep. 7, 2011

(65) Prior Publication Data

US 2011/0319174 A1    Dec. 29, 2011

Related U.S. Application Data

(63) Continuation of application No. 11/007,888, filed on Dec. 8, 2004, now Pat. No. 8,016,677.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/42; 463/40; 463/43
(58) Field of Classification Search .......... 463/42
See application file for complete search history.

(56) References Cited

U.S. PATENT DOCUMENTS

| 6,024,643 | A  | * | 2/2000 | Begis ............................ 463/42 |
| 6,604,997 | B2 |   | 8/2003 | Saidakovsky et al. |
| 6,641,481 | B1 | * | 11/2003 | Mai et al. ....................... 463/42 |
| 6,887,159 | B2 | * | 5/2005 | Leen et al. ...................... 463/42 |
| 7,206,788 | B2 | * | 4/2007 | Horvitz et al. ..................... 1/1 |
| 2002/0055379 | A1 |   | 5/2002 | Saidakovsky et al. |
| 2002/0119824 | A1 |   | 8/2002 | Allen |
| 2003/0045358 | A1 |   | 3/2003 | Leen et al. |
| 2004/0041836 | A1 | * | 3/2004 | Zaner et al. .................. 345/751 |

FOREIGN PATENT DOCUMENTS

| JP | H5-277259 | 10/1993 |
| WO | 00/44458 | 3/2000 |
| WO | 03/049459 | 3/2003 |

OTHER PUBLICATIONS

Office Action received for Japanese Patent Application No. 2005-314531, mailed Oct. 5, 2012, 4 pgs. including 2 pgs. English translation.

* cited by examiner

*Primary Examiner* — Michael Cuff
*Assistant Examiner* — Kevin Y Kim

(57) ABSTRACT

Information is shared among users in a system by the use of a service. The service receives information from at least two different game applications that each have a configuration file (defined with a common schema) that defines information from the game application to share with a service. An intermediary program executing on a computer that is also executing one of said game applications receives information from the application as defined by said configuration files and stores at least a portion of the information received from the application. At least a portion of the information is sent to the service when the intermediary is in communication with the service over a network wherein the service provides information about a user of said at least two game applications based on information received by said service.

20 Claims, 8 Drawing Sheets

SYSTEM AND METHOD FOR CONFIGURING GAME DATA ABOUT PLAYERS

CROSS REFERENCE TO RELATED APPLICATION

This application is a continuation application of U.S. patent application Ser. No. 11/007,888 filed on Dec. 8, 2004, and titled SYSTEM AND METHOD FOR CONFIGURING GAME DATA ABOUT PLAYERS, the content of which is hereby incorporated by reference in its entirety.

FIELD OF THE INVENTION

This invention generally relates to the field of gaming and multimedia devices. In particular, the present invention is directed to a method of sharing data between a game application and a service.

BACKGROUND OF THE INVENTION

In online gaming, game hosting services and game developers have created a number of ways to track and personalize the online gaming experience. One drawback of existing systems is that many of the features have grown up independent of each other. Games send blobs of data about gamers back and forth to a central service, but the service has no way to understand and aggregate the data outside of the game context. Games can host their own Websites, but the data displayed there is not universally accessible to other games. Moreover the service collects its own information about gamers but has no unified process for integrating it with what is happening in the midst of game play.

In a sense, then, the service and games offer two parallel communities that offer great—but separated—resources for gamers. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available. When the game disk is removed, the whole game community disappears from the console, and the gamer's achievements become unreadable.

Second, in the service community, the service knows a gamer's history, all of the games he's played, the amount of time he spends online, the size of his Friends list and all of the games that Friends have played or are playing, the Friends invites sent and received, the Messages sent and received, and all of the Feedback the gamer has given and received. For the gamer, this data manifests as community on the console or PC, but much of it is invisible once the game disk is inserted or the game program is started.

SUMMARY OF THE INVENTION

Information is shared among users in a system by the use of a service. The service receives information from at least two different game applications that each have a schema that defines information from the game application to share with a service. An intermediary program executing on a computer that is also executing one of said game applications receives information from the application as defined by said schemas and stores at least a portion of the information received from the application. At least a portion of the information is sent to the service when the intermediary is in communication with the service over a network wherein the service provides information about a user of said at least two game applications based on information received by said service.

The system employs a tool that generates to schema files for a game without the need for the game developer to create a custom schema.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Figure 1:
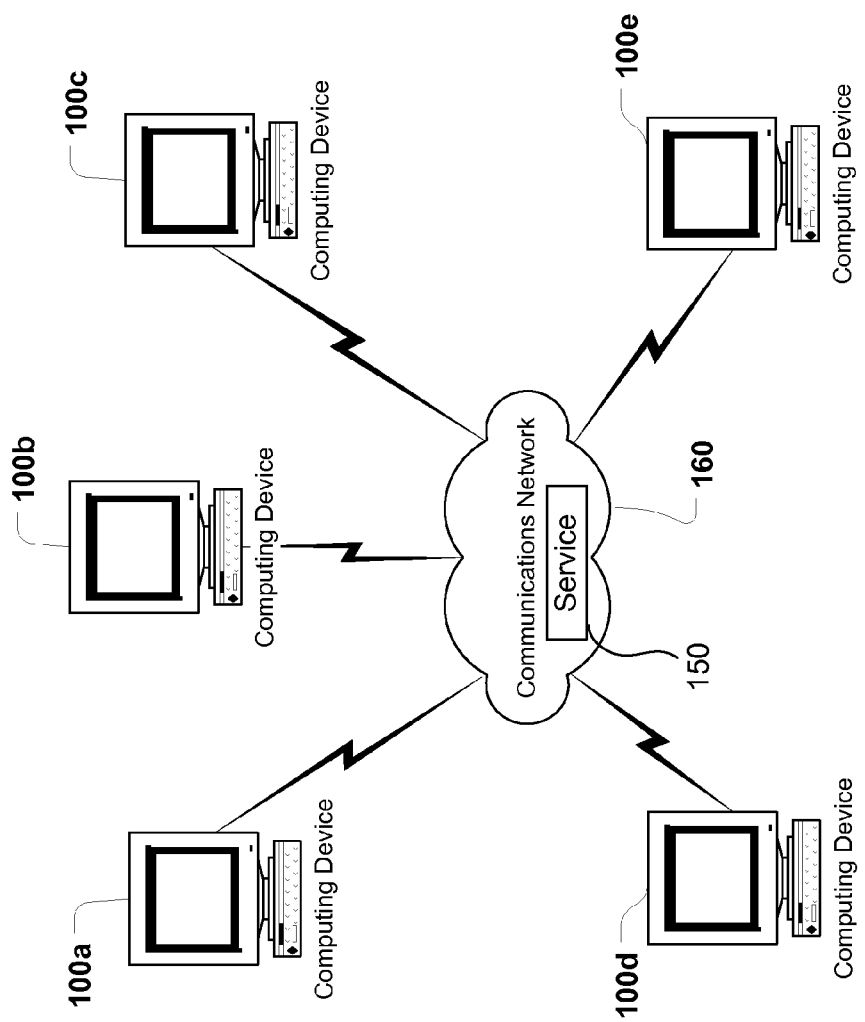
FIG. 1 is a block diagram of an exemplary computer network environment in which aspects of the present invention may be implemented.

FIG. 1 is diagram of an exemplary computer network that serves to illustrate aspects of the invention. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the present invention could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections. Additionally, the computer network may comprises a distributed computing environment. In such an environment a computing task may be spread over a number of computing devices that are addressable elements in a computer network.

According to an aspect of the invention, communication network 160 may host a service 150 that is accessible from the plurality of computers 100a-100e. The service 150 gathers information and tracks users of computers 100a-100e to provide computing services for all of the users of the service.

Figure 2:
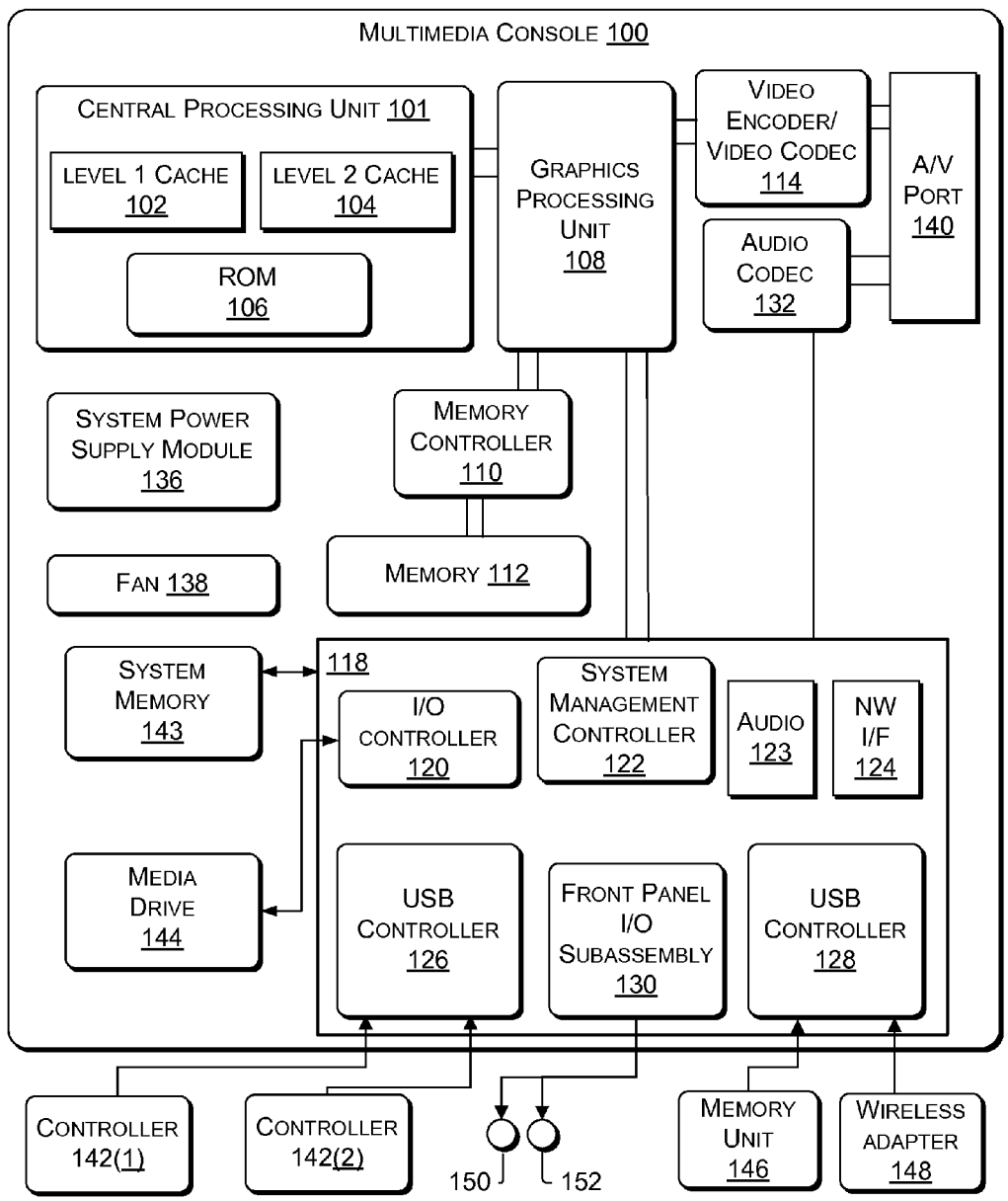
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of the invention, when a game is executed on console 100, it provides information to a service operating on communications network 160. The service tracks the information for all of the users connected to the service to provide a rich user experience. The service tracks user information across games, consoles, computing devices, etc. By tracking the information for all users of the service, the service can aggregate statistics for all users and measure game playing ability, provide a richer user experience by providing information about friends (e.g., what game they are playing and what skill level they have attained), track user achievements and generally measure statistics for a game aggregated over a large user community.

In order to provide a consistent data set across games, the invention contemplates a schema driven process where each game generates a schema that defines the game data for a particular game. Through a game configuration process, games use a service-defined schema to describe the data the game generates about each game player. By using the configuration process, the service will be able to understand the data as it flows from the game, and it will be able to integrate it in meaningful ways with the other data that the service understands to create a rich profile of each user of the service. The profile will follow the user wherever he goes on the service, i.e. it is game and location independent. Some of the profile, in fact, will be viewable by every user of the service.

Figure 3:
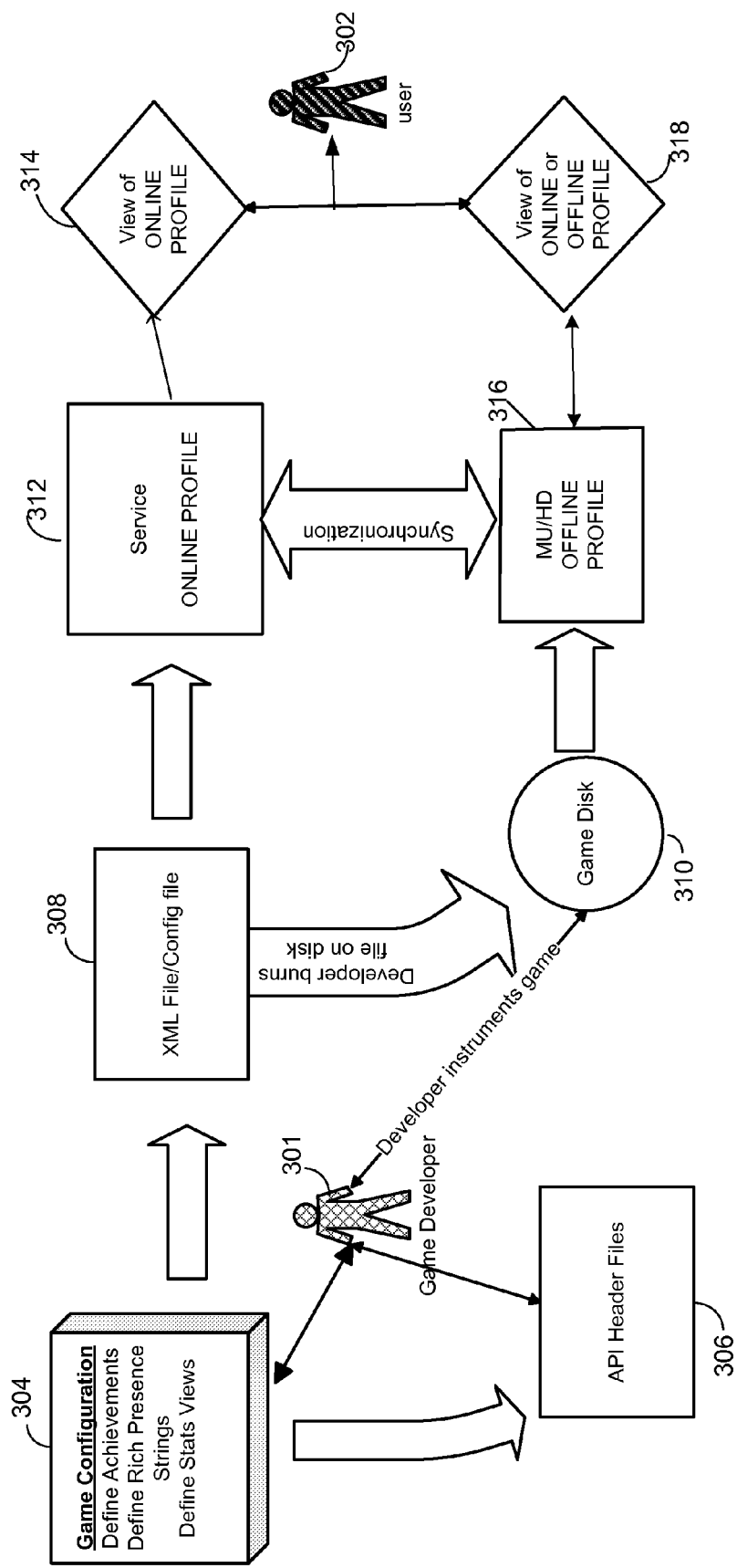
FIG. 3 illustrates the overall system of generating schema files to allow a game application to communicate with a service.

FIG. 3 illustrates the overall process that allows a game developer to configure a game for use with the service. A game developer 301 wants to create a game for use with the service by user 302. To that end, the developer provides a set of game configuration data 304 that will be shared with the service using the tools described more fully below. The output from the use of the tool is a set of API header files 306 that are included with the game to communicate with the service and a set of xml files 308 that define the schema of the data to be shared with the service. Game developer 301 then burns a game disk 310 or creates a game program that contains the game code instrumented with the APIs 306 an the XML schema files 306 (or an equivalent representation). The XML files are also communicated to the service 312 so that the service can use the data output from the game to update the online user profile 312 for user 302 when user 302 uses the game 310 online. When user 302 uses game 310 without a network connection, information is collected and stored on the users offline profile in a hard drive or memory unit 316. Thereafter, when user 302 connects to the service, the online and offline profile is synchronized. User 302 can then view profile information locally 318, i.e. on the console 100 or PC or log on to the service and view the user profile 314.

Figure 4:
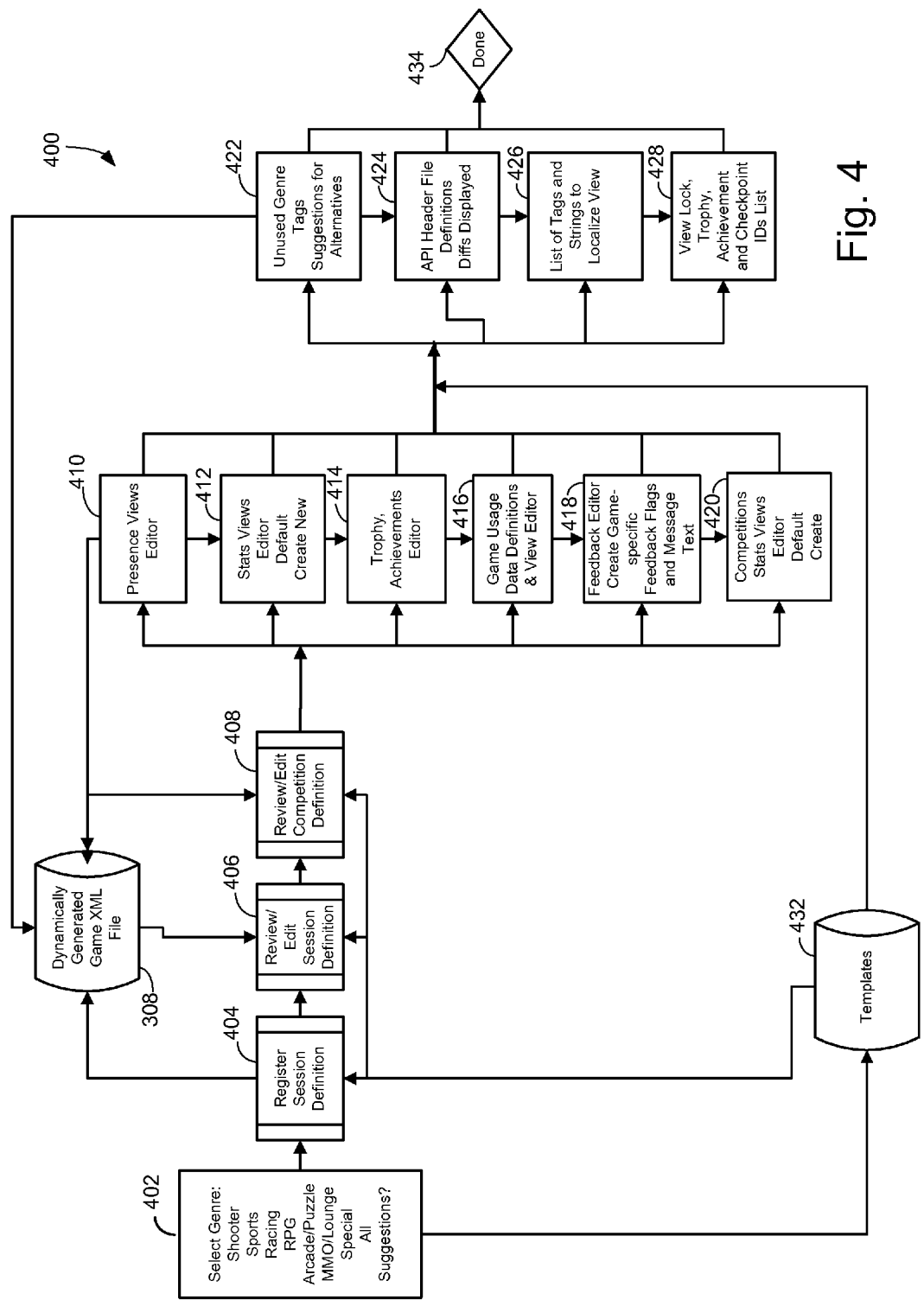
FIG. 4 is a flow diagram that illustrates the generation of a schema.

FIG. 4 further illustrates the flow of configuration tool 400 used to generate the XML files 308 for use with the service. Initially, game developer 301 selects the game genre 402, e.g., shooter, racing, etc. The genre selection is then used to generate a set of templates that have predefined types of data that would generally be collected by the service when such a game is being played. Game developer 301 then reviews and edits the various session information and competition information generated by the templates at steps 404, 406, 408. The edits are used to modify XML file 308 that underlies the tool. Game developer 302 then edits the XML file (via the tool) with respect to the presence data to be generated by the game 410, statistics 412, trophy achievements 414, game usage 416 and competition statistics 420. After completing those edits, the system checks for unused genre tags and suggests alternative tag usage in order to enforce a certain level of cross game compliance with genre information (step 422). Thereafter, API header files are automatically generated (step 424) based on the XML definition, and a list of tags is create for localized views of the information (e.g., Japanese, Spanish, and so on) (step 426). A set of identifiers are created that are specific to achievements defined for a specific game (step 428) and the process is complete (step 434).

The pre-defined, genre-specific values, which will be extensible, will capture the key bits of stats, achievements, presence, and other data that the service will need to understand and show a user's activity inside and outside of the game. The game developers do not have to interact directly with these values; instead, they can adopt them using the configuration tool.

The configuration tool allows game developers to input their game's description using both values pre-defined in the tool and the game's own extended set of trackable values. On the back end, the tool produces an XML configuration file that provides a formatted enumeration of all of the values entered in the tool.

The tool has five main parts:

Match Session Editor: here, the game tells the console the steps a user will need to go through to create a gameplay session for Matchmaking. This definition makes sure that the console understands all of the key game permutations (from map names to difficulty levels) so that console can capture the starting point of a game session.

View Editor: View editors are the pieces of the tool that allow game developers to tell the service how particular bits of game data are to be used to construct key service features like stats and presence. The views allow the developer literally to specify the types of stats they want to track and which aggregations methods to use on the stats (e.g. "track total kills per map" or "track kills/deaths per map"). The config toole will provide a number of default views to make sure that each game has a minimum set of required stats and presence fields defined.

Context, Property, and Achievements Editor: The tool includes a mechanism for game developers to define an Achievement and display it (including description, title, and trophy image), to create a Context (e.g. map and its enumerations), and to create a new Property (e.g. kills stat).

Rich Presence Mode Editor: A game developer uses the Rich Presence Mode editor to author a Rich Presence string that contains static text and variable tokens (defined by Contexts and Properties that can be updated during the game).

Outputs for developers: the tool outputs API header files, a list of strings to localize, the format of a "start session" message that games will receive from the service when gamers create a session outside of the game, and a config file that the game will need to include on the game disk (so that the console client, even offline, can interpret the data flowing out of the game).

The game talks to the service with the SetContext, SetProperty and Session APIs. Since most of the complex structure of the game is captured in the configuration tool, the APIs for writing data to the service are relatively simple. In fact, there are essentially only three things a game needs to tell the service for the service to be able to construct a User Profile:

SetContext: Game "contexts" are sets of discrete, enumerate values like maps, vehicles, guns, and other game states that may change but that don't have any aggregation methods associated with them. The SetContext API, then, tells the service when a context has changed (and how it has changed).

SetProperty: Game "properties" are game elements or events that have an operation or aggregation methods that need to be applied to them. Properties include such things as kills (add), bullets fired (add), wins (add), health (subtract or add), or time (take lowest time, in a racing game). The SetProperty API, then, is a message to the service that a property is coming in and it needs to operate on it in the appropriate way.

SetAchievement: Game Achievements are trophies earned during game play. The SetAchievement API is a message to the service (or offline storage) that a user has earned an Achievement.

Session information: Games must tell the service when a session has begun, when a user has been added (or has left) the session, and when the session has ended. The session information, coupled with Context and Property information and a view definition, allows the client software to know which properties need to be aggregated together in a game, who they belong to, and when the data set is complete for exporting.

Localization: To make stats, presence, and achievements visible on the console and on the Web world wide, it is essential that games provided localized strings for all of the extensions XML values. The config tool includes a localization tool that will allow games to track which strings still need to be localized. Pre-defined values will already have localized strings associated with them.

Read APIs: User Profile Data feature that the service provides to games will have an associated API for reading data back for display or other purposes (stats, achievements, matchmaking etc.).

With this process completed, games are connected to the User Profile Data stream. This means that stats, presence, and achievement information for each gamer is advertised to the entire community even after the game disk is removed. It means that features built into the system that leverage the game's User Profile Data will be improved over time after the game has shipped. It means that matchmaking players for a game will draw from a host of data that virtually insures a good fit for the players even if none of them have ever played the game before.

Figure 5:
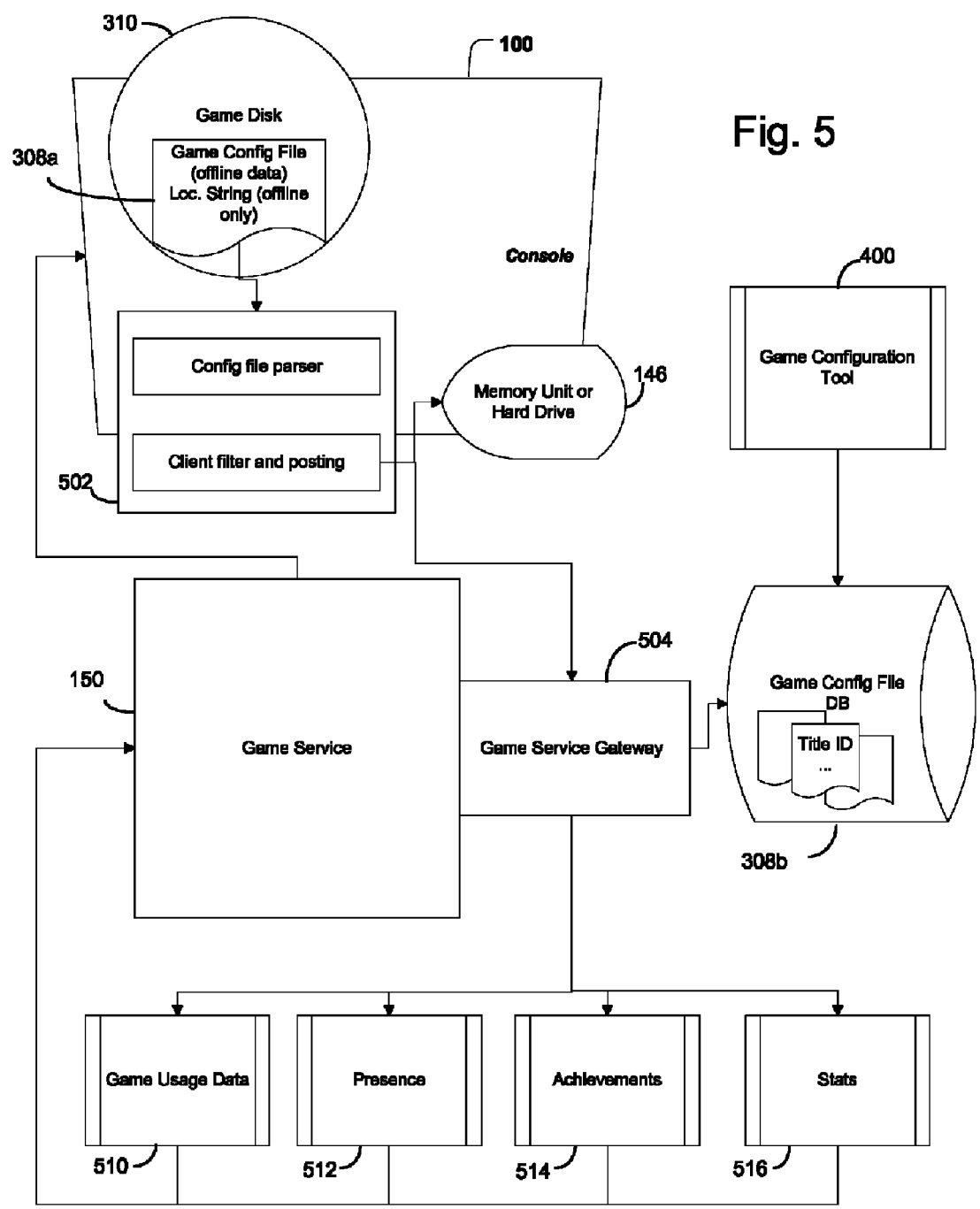
FIG. 5 illustrates the architecture of the game and service communication.

In conjunction with FIG. 5, the paragraphs that follow detail the ways in which all of this User Profile Data being sent by games to the service will be consumed and reflected back to users, games, and the entire user community. As illustrated in FIG. 5, after use of configuration tool 400, the game program 310 has configuration file 308a that describes the information to be written during the use of the game and shared with service 150. Additionally service 150 has copies of the XML configuration file 308b so that it understands the data points that it will collect from the game. Thereafter, when console 100 is connected to service 150, the game communicates typical game data for multiplayer online gaming. This communication happens via a console gateway component 502 which aggregates data on the client and communicates information about the user during game play that is collected in accordance with the configuration file 308a. This console gateway component prevents the network from being flooded with overly frequent updates from the game program. That information is periodically routed to service 150 by way of game service gateway 504.

Notably, the system contemplates that data about the game play can be collected even when a user is offline. Various information and statistics are recorded to memory unit 146 and then shared with service 150 when the console 100 connects to service 150. Similarly, even when the user is online the information collected can be buffered in memory unit 146 so that it can be uploaded to the service in an efficient way (i.e. not necessarily in real-time). Further, the service can, by parsing the game's XML configuration file, determine the one or more service features that need to consume the game data (for example, services such as 510, 512, 514 and 516, representing game usage data, rich presence, achievements and statistics, respectively). The following paragraphs further illustrate the use of the collected information.

Statistics service 516 assists in tracking and displaying a wide-variety of in-game stats, such as number of kills, best lap times or high scores. All stats have to be schematized in terms of Properties, Contexts and Views. For example, a first-person shooter title may want to define a 'Kills' Property to be tracked independently for each 'Map' Context (e.g. 5 Kills on Blood Creek vs. 10 Kills on Battle Range). The last step needed to display these stats (in-game or on the web or elsewhere) is to define a View, e.g.:

| "PER-MAP KILLS" | |
| --- | --- |
| Map | Kills |
| Blood Creek | 5 |
| Battle Range | 10 |

In the example above, the 'Kills' Property uses the SUM aggregation method to combine the series of stats updates from every game session. In addition to SUM, the system supports other aggregation methods, such as MIN, MAX, ELO and LAST.

By virtue of being captured in the game's XML config file in a stats View, Properties are aggregated on the client and set to the service where they are correctly stored and made available for formatting and display.

Each game should support a minimal set of Properties, Contexts and Views that match the character of the game.

Achievements service 514 takes a different approach to tracking player stats by emphasizing individual progress and accomplishments (e.g. a trophy case) over global ranking against the entire population of players.

Achievements are intended to track check-point completion, advancing to a new skill level, hitting a career milestone, earning/unlocking new content, placing in Live events, such as tournaments and/or any notable in-game events. Achievements are explicitly called out in the XML config file and are written via the SetAchievement API.

Each game title should support several pre-defined Achievements, such as "Ten Hours Played" and "100 Sessions Played". Additionally, each game should define a minimum of five game-specific Achievements that are associated with Points awards.

Rich Presence service 512 compiles online presence/status information for all players. As a result, a user will not just be able to tell if his or her friend is online, and what title the friend is playing, but also where the friend is in the game, what the score is, and/or how much time is left in the game.

For use with Rich Presence service 512 games should update the context and property associated with the current game state of a user. Games have the ability to create a custom, localizable context based Rich Presence string/parser for their game. The Rich Presence strings can consist of the predefined, genre-specific properties or contexts or game customizable properties or contexts. Some of the same contexts or properties used in Rich Presence (e.g. Map) may also be used for setting the Matchmaking session parameters. The Rich Presence string/parser can be thought of as a Printf statement where Properties or Lookups can be substituted in.

Client software will manage the UI and Presence requirements for Friends, Groups, and Recent Players. It will also provide a richer cross-title view of gamers who are online and offline. The game does not have to have code to deal with how the user defines their state, time online, idle etc. The game only needs to have code to deal with the context and properties that are most important for other people to broadcast from their game.

Examples of a Rich Presence screen display:

| User name | Status |
| --- | --- |
| PaddyOFurniture | Playing Halo 2 [3$^{rd}$ Place] (Match ends in 1:13) |
| Nemesis | Online - Playing Fever 2004 [Score:21-10] (12:34 remaining) |
| BOT | Offline - On MSN Messenger |
| Kid Galahad | Offline - Last seen Jan 13 @ 4:58 pm Playing Prince Of Persia |
| Paul Bunyan | Offline - Last seen Jan 11 @ 1:14 am Playing Amped 2 |

Figure 6:
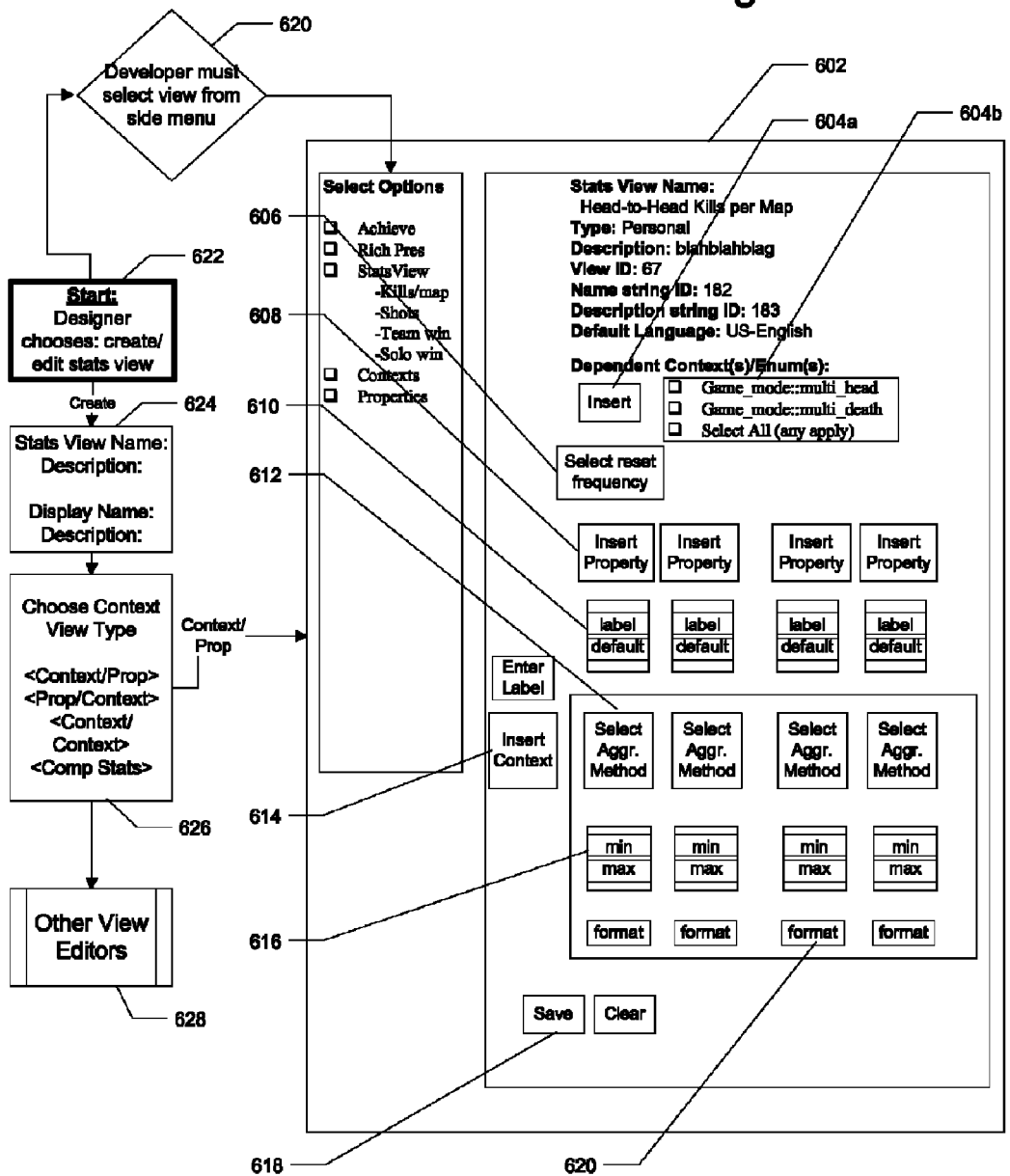
FIGS. 6-8 illustrates the tools that may be used by a developer to generate a schema for use in communication between a game and the service.
Figure 7:
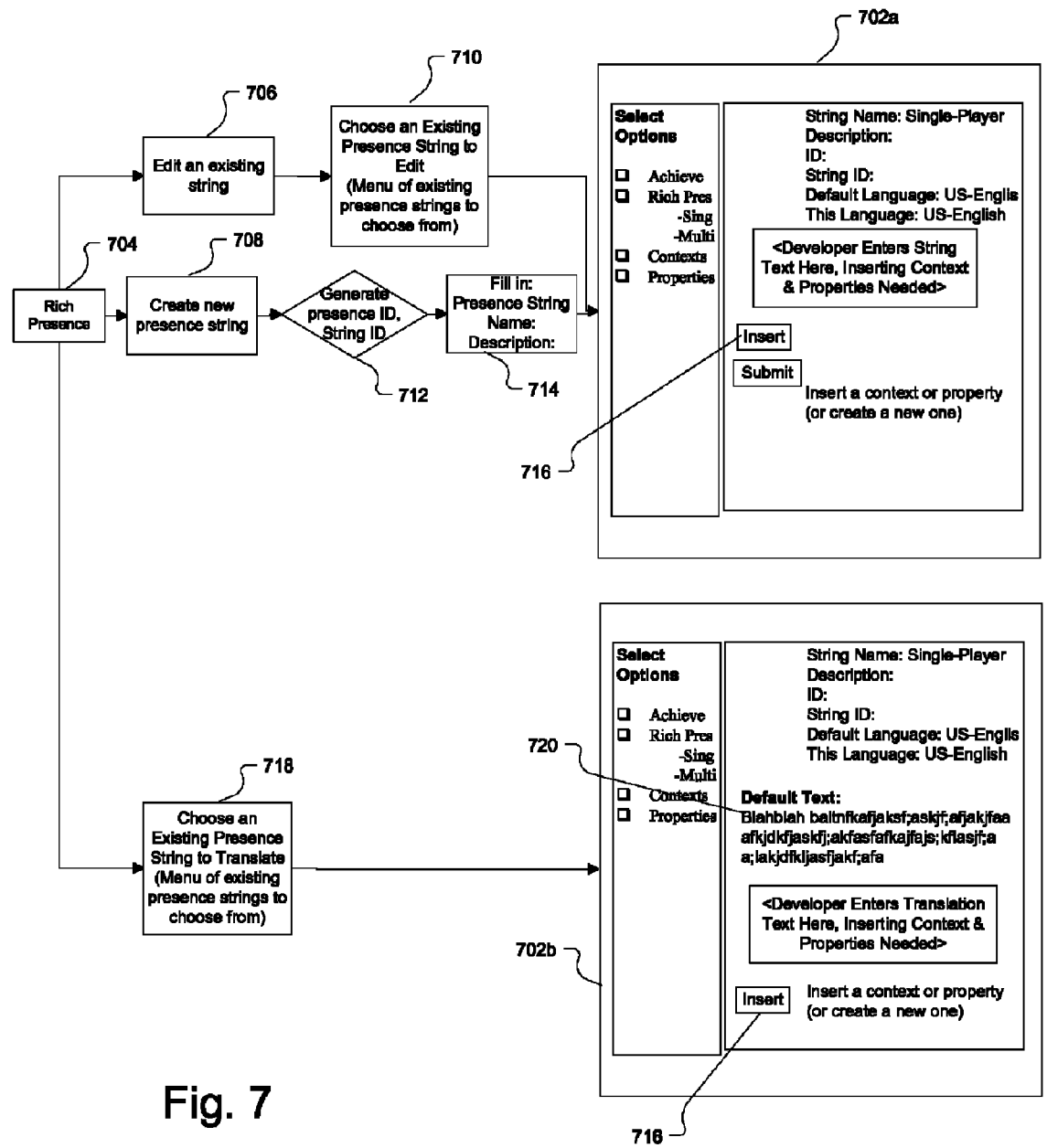
Figure 8:
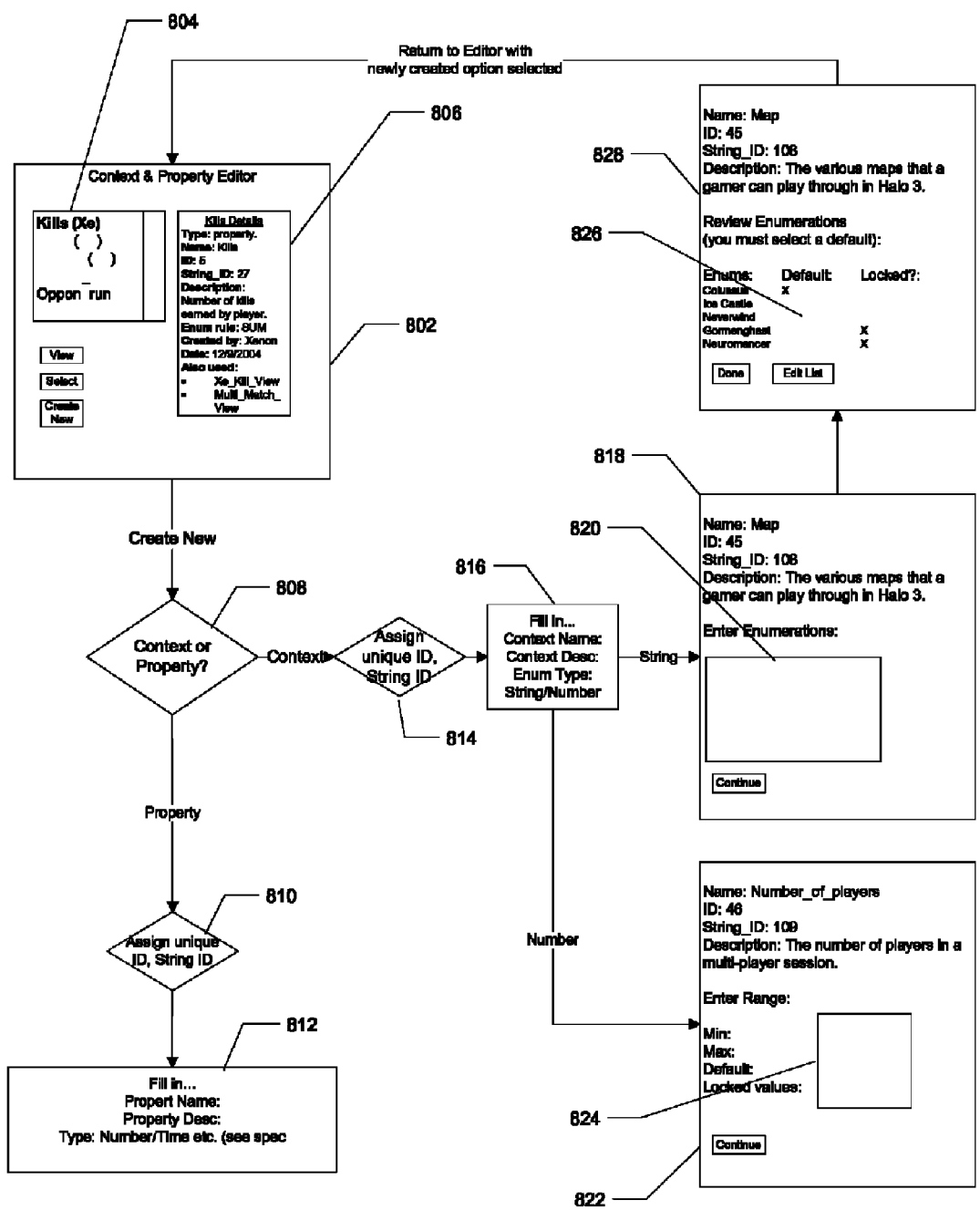

FIGS. 6-8 further illustrates the tools used for generating the configuration files for communication between the console and the service. In general, the configuration tools make it easy for the game developer to standardize the communication process.

FIG. 6 illustrates the process for determining which statistics information will be shared between the game and the service. This Figure illustrates the tool view 602 after the developer (e.g., 301) selects stats view at step 620. Thereafter, at step 624 the developer begins creating a statistics configuration. Insert button 604a allows the developer to specify one or more contexts from the insert context menu shown in box 604b (step 626) and gets back to the main screen 602. Boxes 608 allows a developer to set a number of properties to track. The example here shows that developer has selected four properties to track. Box 610 allows a developer to add a label for the property. Box 612, allows the developer to select an aggregation method, e.g., SUM. Box 616 lets the developer set a min and max ranges, e.g., 2 to 100. Box 620 allows the developer to set a format for the property e.g., number, time, percentage, etc. After the developer has entered all of the information for a particular context, button 618 saves the configuration and allows the developer to review and edit the data.

FIG. 7 further illustrates the rich presence editor. Starting at step 704, a user selects rich presence and determines whether to edit an existing string (step 706), create a new string (step 708), or choose an existing presence string to translate (step 718). If step 706 is chosen, then the developer selects, e.g., from a menu, a presence string to edit. As shown in box 702a, the developer enters a string and inserts it into the configuration file using the insert button 716. If step 708 is chosen, a presence ID and a string ID are generated at step 712. Thereafter at step 714, the developer fills in the string name, description, etc. If step 718 is selected, the developer enters the translation for the text as shown in box 702b.

Finally, in FIG. 8, the context and property editor is further illustrated. At step 808, a developer desires to create a new context or property. If a context is selected, a unique ID and string ID is assigned. At step 816, the developer fills in the name, description, enum type (string or number). If the enum type is set to string, the developer enters the enumeration in box 820 as shown in box 818. For example, the developer can list the various map names that exist for a game. As each is defined, a unique ID and string ID is assigned. If the enum type is set to number, box 822 allows the developer to enter the number information in box 824. At box 828, the developer defines which enums are locked and which one is the default in a menu displayed to a user as shown in check box 826.

If at step 808 the developer selects a property, then a unique ID and string ID are assigned for the property (step 810) and the developer fills in the property names, description and types.

As a result of all of the information entered by the developer, an XML file is generated describing the various Statistics, Rich Presence, etc. information for the game that describes the various contexts and properties. This information is used by gateway 502 to determine which information the console should aggregate before sending to the service, which information should be sent to the service raw, how the information should be formatted and how, what labels should be displayed for the information and so on. An example XML output file is provided in a computer program listing appendix stored on an accompanying text file for the instant patent application, and hereby incorporated by reference in its entirety.

Of course, the XML is but one example of an output format. Other output formats could also be used. Moreover, the XML can be converted to a different form such as a binary file format.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A system for matching users for a game, comprising:
   a processor; and
   a service configured to construct, using the processor, a first profile for a first user based on one or more plays of one or more first other games by the first user, and to construct a second profile for a second user based on one or more plays of one or more second other games by the second user, wherein the service is configured to use the first profile and the second profile to match the first user and the second user for a play of a game, wherein one or more of the first other games are different from the game and one or more of the second other games are different from the game.

2. The system of claim 1, wherein the first profile and the second profile comprise aggregated statistics tracked across a plurality of computing devices.

3. The system of claim 1, wherein the first profile and the second profile comprise aggregated statistics that measure game playing ability.

4. The system of claim 1, wherein the play of the game is a first play of the game by the first user and a first play of the game by the second user.

5. The system of claim 1, the service configured to store the first profile and the second profile on a network-accessible server.

6. The system of claim 1, the service configured to transmit the first profile and the second profile to network-connected client computers of a community of users of said service.

7. The system of claim 1, wherein the first profile and second profile comprise XML content.

8. A method for matching users for a game, comprising:
   constructing, using a processor, a first profile for a first user based on one or more plays of one or more first other games by the first user;
   constructing a second profile for a second user based on one or more plays of one or more second other games by the second user; and
   using the first profile and the second profile to match the first user and the second user for a play of a game, wherein one or more of the first other games are different from the game and one or more of the second other games are different from the game.

9. The method of claim 8, wherein the first profile and the second profile comprise aggregated statistics tracked across a plurality of computing devices.

10. The method of claim 8, wherein the first profile and second profile comprise aggregated statistics that measure game playing ability.

11. The method of claim 8, wherein the play of the game is a first play of the game by the first user and a first play of the game by the second user.

12. The method of claim 8, comprising storing the first profile and the second profile on a network-accessible server.

13. The method of claim 8, comprising transmitting the first profile and the second profile to network-connected client computers of a community of users of said service.

14. The method of claim 8, wherein the first profile and second profile comprise tag-based schemas.

15. An article of manufacture comprising a media drive containing instructions that when executed enable a system to:

construct a first profile for a first user based on one or more plays of one or more first other games by the first user, the first profile comprising aggregated statistics that measure the first user's game playing ability;

construct a second profile for a second user based on one or more plays of one or more second other games by the second user, the second profile comprising aggregated statistics that measure the second user's game playing ability; and use the first profile and the second profile to match the first user and the second user for a play of a game, wherein one or more of the first other games are different from the game and one or more of the second other games are different from the game.

16. The article of claim 15, wherein the first profile and the second profile comprise aggregated statistics tracked across a plurality of computing devices.

17. The article of claim 15, wherein the play of the game is a first play of the game by the first user and a first play of the game by the second user.

18. The article of claim 15, comprising instructions that when executed enable a system to store the first profile and the second profile on a network-accessible server.

19. The article of claim 15, comprising instructions that when executed enable a system to transmit the first profile and the second profile to network-connected client computers of a community of users of said service.

20. The article of claim 15, wherein the first profile and the second profile comprise XML content.

\* \* \* \* \*